United States Patent Office 3,743,638
Patented July 3, 1973

3,743,638

POLYMETHINE DYES

Frank G. Webster and Leslie G. S. Brooker, Rochester, N.Y., assignors to Eastman Kodak Company, Rochester, N.Y.

No Drawing. Original application Mar. 19, 1970, Ser. No. 21,210. Divided and this application Apr. 19, 1971, Ser. No. 135,358
Int. Cl. C09b 23/10
U.S. Cl. 260—240.4 5 Claims

ABSTRACT OF THE DISCLOSURE

A novel class of dyes especially useful as sensitizers for photographic silver halide emulsions and electrographic coatings of zinc oxide having the following structure:

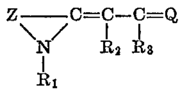

wherein Z represents the atoms required to form a basic heterocyclic nucleus; $R_1$ is an alkyl or aryl radical; $R_2$ and $R_3$ are selected from the group consisting of a hydrogen atom, lower alkyl radical or aryl radical and Q is a radical selected from:

(a)

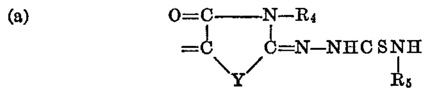

wherein $R_4$ is selected from the group consisting of a hydrogen atom, an alkyl radical or an aryl radical and Y is selected from the group consisting of an oxygen atom, a sulfur atom or a selenium atom and $R_5$ is selected from the group consisting of a hydrogen atom, an alkyl atom or an aryl atom; or (b)

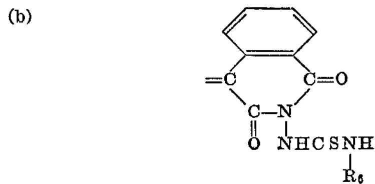

wherein $R_6$ has the same designated value as $R_5$.

This application is a division of our copending U.S. patent application Ser. No. 21,210, filed Mar. 19, 1970, now U.S. Pat. 3,630,749.

This invention relates to polymethine dyes and more particularly to merocyanine dyes containing a thioureido group.

The use of sensitizing dyes in photography is well known. Among the variety of recognized dyes for this purpose are included certain of the merocarbocyanine dyes.

It is an object of the invention to provide a new class of dyes especially useful as sensitizers for photographic silver halide emulsions and electrographic coatings of zinc oxide.

It is also an object of the invention to provide sensitized, light-developable, direct-print silver halide emulsions.

Another object of the invention is to provide novel sensitized electrographic coating compositions of zinc oxide.

These and other objects of the present invention are accomplished by merocyanine dyes having the following structure:

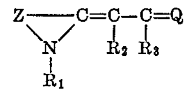

wherein Z represents the non-metallic atoms required to complete a basic heterocyclic nucleus generally having 5 to 6 atoms in the heterocyclic ring such as carbon, sulfur, selenium, oxygen and nitrogen to form such moieties as a benzothiazole, a benzoxazole, a quinoline, a naphthothiazole, a naphthoxazole, a benzimidazole, a benzoselenazole, a naphthoselenazole, an oxazole, a thiazole, a thiazoline, a pseudoindole and the like; $R_1$ is an alkyl radical or an aryl radical such as phenyl; $R_2$ and $R_3$ are hydrogen atoms, lower alkyl radicals or aryl radicals such as phenyl and Q is selected from:

(a)

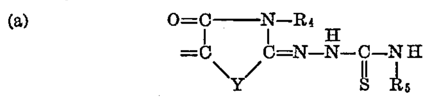

wherein $R_4$ is a hydrogen atom, an alkyl radical or an aryl radical such as phenyl and Y is an oxygen atom, a sulfur atom or a selenium atom and $R_5$ is a hydrogen atom, an alkyl radical or an aryl radical such as phenyl or (b)

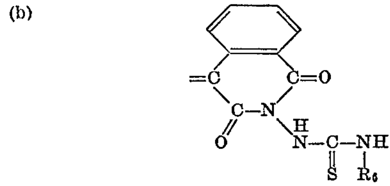

wherein $R_6$ is a hydrogen atom, an alkyl radical or an aryl radical such as phenyl.

$R_1$, $R_4$, $R_5$ and $R_6$, when alkyl, can be an alkyl radical having 1 to 18 carbon atoms such as methyl, ethyl, propyl, isopropyl, butyl, isobutyl, pentyl, hexyl, heptyl, octyl, nonyl, decyl, undecyl, dodecyl, tridecyl, tetradecyl, pentadecyl, hexadecyl, heptadecyl and octadecyl, for example, preferably a lower alkyl radical having 1 to 4 carbon atoms. $R_2$ and $R_3$, when alkyl, each represent a lower alkyl radical having 1 to 4 carbon atoms such as methyl, ethyl, propyl, isopropyl, butyl and isobutyl, for example. The alkyl and aryl radicals of the described dyes may be substituted or unsubstituted.

Typical dyes of the invention include:

3-ethyl-5-[(3-ethyl-2-benzoxazolinylidene)ethylene]-2-thioureidoimino-4-thiazolidinone;
3-ethyl-5-[(1-ethyl-4(1H)-quinolylidene)ethylidene]-2-[(3-phenylthioureido)imino]-4-thiazolidinone;
3-ethyl-5-[(1-ethyl-4(1H)-quinolylidene)ethylidene]-2-[(3-phenylthioureido)imino]-4-thiazolidinone;
3-ethyl-5-[(3-ethyl-2-benzoxazolinylidene)ethylidene]-2-thioureidoimino-4-thiazolidinone;
3-ethyl-5-[(1-ethyl-4(1H)-quinolylidene)ethylidene]-2-[(3-phenylthioureido)imino]-4-thiazolidinone;
3-ethyl-5-[(3-ethyl-2-benzoxazolinylidene)ethylidene]-2-thioureidoimino-4-oxazolidinone;
3-ethyl-5-[(1-ethyl-4(1H)-quinolylidene)ethylidene]-2-[(3-phenylthioureido)imino]-4-oxazolidinone;
3-ethyl-5-[(3-ethyl-2-benzoxazolinylidene)ethylidene]-2-thioureidoimino-4-oxazolidinone;
3-ethyl-5-[(3-ethylnaphth[2,1-d]oxazolin-2-ylidene)-ethylidene]-2-[(3-phenylthioureido)imino]-4-thiazolidinone;
3-ethyl-5-[(3-ethyl-5-phenyl-2-oxazolinylidene)ethylidene]-2-thioureidoimino-4-thiazolidinone;
3-ethyl-5-[(1,3,3-trimethyl-2-indolinylidene)ethylidene]-2-thioureidoimino-4-thiazolidinone;

3-methyl-5-[(3-methyl-2-thiazolidinylidene)ethylidene]-2-thioureidoimino-4-thiazolidinone;
3-butyl-5-[(3-methyl-2-benzoxazolinylidene)ethylidene]-2-[(3-phenylthioureido)imino]-4-thiazolidinone;
3-methyl-5-[(3-methyl-2-thiazolidinylidene)ethylidene]-2-thioureidoimino-4-thiazolidinone;
3-ethyl-5-[(3-ethyl-2-benzoselenazolinylidene)ethylidene]-2-[(3-ethylthioureido)imino]-4-thiazolidinone;
3-ethyl-5-[3-(1,2-dihydropyrrolo[2,1-b]-benzothiazolyl)methylene]-2-thioureidoimino-4-thiazolidinone;
5-[3-(1,2-dihydropyrrolo[2,1-b]benzothiazolyl)methylene]-3-propyl-2-thioureido-4-oxazolidinone;
3-ethyl-5-[(3-ethyl-2-benzoxazolinylidene)-ethylidene]-2-thioureidoimino-4-selenazolidinone;
5-[(5,6-dichloro-1,3-diethyl-2-benzimidazolinylidene)ethylidene-3-ethyl-2-[(3-phenylthioureido)imino]-4-thiazolidinone;
4-[(3-ethyl-2-benzothiazolinylidene)ethylidene]-2-thioureido-1,3(2H,4H)-isoquinolinedione;
4-[(1-ethyl-4(1H)-quinolylidene)ethylidene]-2-[(3-phenylthioureido)imino]-1,3(2H,4H)-isoquinolinedione;
4-[(3-ethylnaphth[2,1-d]oxazolin-2-ylidene)-ethylidene]-2-[(3-phenylthioureido)imino]-1,3(2H,4H)-isoquinoline.

In general, the dyes of the invention wherein Q is

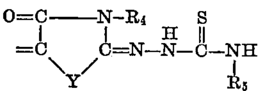

may be prepared by condensing a cycloammonium quaternary salt having the formula:

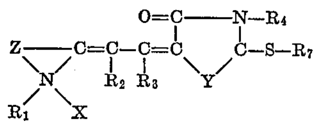

wherein $R_1$, $R_2$, $R_3$, $R_4$ and Y are as described above; $R_7$ is alkyl or aryl and X represents an acid anion, e.g. chloride, bromide, iodide, p-toluene sulfonate, etc. with a compound having the formula:

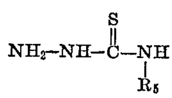

wherein R is as previously described in the presence of a condensing agent, e.g. trimethylamine, triethylamine, tripropylamine, N-methyl piperidene, N,N-dimethyl aniline, pyridine, etc. Advantageously, an inert solvent for the reagents is used in the reaction such as ethanol, acetic anhydride, and the like. Dyes of the invention wherein Q is the defined thioureido group containing isoquinolinedione may be prepared by condensing

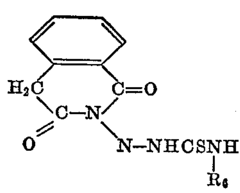

wherein $R_6$ is as described above, with

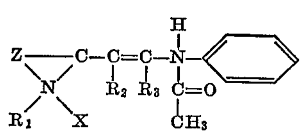

in the presence of a condensing agent such as triethylamine, pyridine and others. Inert solvents as described above are preferably used in the reaction.

The dyes of the invention may be used in a wide variety of photographic silver halide emulsions and especially light-developable, direct-print photographic silver halide emulsions. Suitable silver halides include silver chloride, silver bromide, silver bromoiodide, silver chloroiodide, chlorobromide, and silver chlorobromoiodide. For a description of suitable emulsions, reference is made to Davey et al., U.S. Pat. No. 2,592,250, issued Apr. 8, 1962; Glafkides, Photographic Chemistry, vol. 1, pp. 31–32, Fountain Press, London; and McBride, U.S. Pat. No. 3,271,157, issued Sept. 6, 1966 wherein is disclosed the preparation of silver halide emulsions with organic thioether silver halide solvents present during the grain growth of the silver halide. Generally, about .1 to 25 g. of such thioethers per mole of silver halide is used. Typical of such thioethers are 3,6-dithia-1,8-octanediol, 1,10-dithia-4,7,14,16-tetraoxacyclooctadecane, 7,10-diaza-1,16-dicarboxamido-3,14-dithiahexadecane-6,11-dione, and 1,17-di-(N - ethylcarbamyl)-6,12-dithia-9-oxaheptadecane. The present silver halide emulsions generally have an average grain size of about .1 to 10 microns, and more generally, about .5 to 1 micron.

A wide variety of hydrophilic, water-permeable organic colloids can be suitably utilized in preparing the silver halide emulsions or dispersions of the invention. Gelatin is preferably utilized although other colloidal material such as colloidal albumin, cellulose derivatives, synthetic resins or the like can be utilized. Suitable colloids that can be used are polyvinyl alcohol or a hydrolyzed polyvinyl acetate as described in Lowe, U.S. Pat. No. 2,286,215, issued June 16, 1942; a far hydrolyzed cellulose ester such as cellulose acetate hydrolyzed to an acetyl content of 19 to 26% as described in U.S. Pat. No. 2,327,808 of Lowe and Clark, issued Aug. 24, 1943; a water-soluble ethanolamine cellulose acetate as described in Yutzy, U.S. Pat. No. 2,322,085, issued June 15, 1943; a polyacrylamide having a combined acrylamide content of 30 to 60% and a specific viscosity of 0.25 to 1.5 on an imidized polyacrylamide of like acrylamide content and viscosity as described in Lowe, Minsk and Kenyon, U.S. Pat. No. 2,541,474, issued Feb. 13, 1951; zein as described in Lowe, U.S. Pat. No. 2,563,791, issued Aug. 7, 1951; a vinyl alcohol polymer containing urethane carboxylic acid groups of the type described in Unruh and Smith, U.S. Pat. No. 2,768,154, issued Oct. 23, 1956; or containing cyanoacetyl groups such as the vinyl alcohol-vinyl cyanoacetate copolymer as described in Unruh, Smith and Priest, U.S. Pat. No. 2,808,331, issued Oct. 1, 1957; or a polymeric material which results from polymerizing a protein or a saturated acrylated protein with a monomer having a vinyl group as described in Illingsworth, Dann and Gates, U.S. Pat. No. 2,852,382, issued Sept. 19, 1958.

The amount of sensitizing dyes utilized can be widely varied. The concentration of the dyes will vary according to the type of emulsion and according to the effect desired. The suitable and most economical concentration for any given emulsion will be apparent to those skilled in the art upon making the ordinary tests and observations customarily used in the art of emulsion making. Generally, about 10 to 1000 mg. of dye per mole of silver halide in the emulsion are utilized. About .05 to 1 mole percent of sensitizing dye based on the silver halide in the emulsion is a typical working range. A single sensitizing dye or combinations of several sensitizing dyes can be used in the present emulsions for spectral sensitization.

Halogen acceptors of the type utilized in conventional light-developable, direct-print silver halide emulsions can be incorporated in the present emulsions. Typical halogen acceptors that can be utilized in the emulsions of the invention include stannous chloride, thiosalicyclic acid, 1-phenyl-3 - pyrazolidone, thiourea, thiosemicarbazide, 1-methyl-2-imidazolethinone, 1-n-butyl-1,2,5,6-tetrahydro-1,3,5-triazine-4-thiol, D-mannose thiosemicarbazone, 1-phenyl-5-mercaptotetrazole, 4-thiobarbituric acid, urazole, 3-thiourazole, 1-phenylurazole, 4-ethylurazole, 3-iminothiourazole and the like halogen acceptors.

The subject photodevelopable photographic silver halide emulsions of the invention may also contain addenda generally utilized in such products including gelatin hardeners, gelatin plasticizers, coating aids and the like.

The above-described emulsions of the invention can be coated on a wide variety of supports in accordance with usual practices. Typical supports for photographic elements of the invention include paper, cellulose nitrate film, cellulose acetate film, polyvinyl acetyl film, polystyrene film, polyethyleneterephthalate film, polyethylene-coated paper, and related films of resinous materials and others.

In forming a photodeveloped image with a typical photographic element having coated thereon an emulsion of the invention, the emulsion on the element is initially exposed to a high intensity light source to form a latent image in the emulsion, and thereafter, the resulting latent image is photodeveloped by exposing it to a light source of less intensity then the original exposure. A typical instrument for exposing the emulsion of the invention is an oscillograph of the type described by Heiland in U.S. Pat. No. 2,580,427, issued Jan. 1, 1952. Typical suitable high intensity light sources are mercury vapor lamps that have high blue and ultraviolet emission, Xenon lamps that emit light of wavelengths similar to daylight, and tungsten lamps that have high red emission. The low intensity light source that is utilized to effect the photodevelopment after the high intensity exposure can be conventional fluorescent light, a tungsten light or even ordinary daylight. After exposure and photodevelopment, emulsions of the invention containing the above-described dyes of the invention can be chemically developed and fixed to make archival-quality records, if desired.

The dyes of the invention also are particularly useful as sensitizers for electrographic coatings of zinc oxide. In this photographic process, zinc oxide powder is dispersed in a suitable binder, usually a thermoplastic polymer such as a copolymer of butadiene and styrene and the composition coated on a suitable substrate. The dye of the invention ordinarily is incorporated into the coating by dipping the coating into a solution of the dye and drying. The concentration of dye in the coating will vary depending upon the particular binder and substrate employed, but usually falls in the range of about .05 to 1 mole percent of dye based on the zinc. The dried article is then ready for charging, as by a corona discharge, and exposure.

The invention may be further illustrated by reference to the following examples:

EXAMPLE I

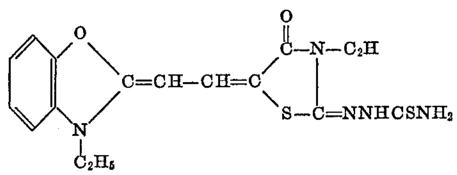

3-ethyl-5-[(3-ethyl-2-benzoxazolinylidene)ethylidene]-2-thioureidoimino-4-thiazolidinone A mixture of 1.7 g. (1 mole) of 3-ethyl-5-[(3-ethyl-2-benzoxazolinylidene)ethylidene]rhodanine and 0.9 g. (1 mole) of methyl-p-toluenesulfonate is heated over an open flame until a melt forms. The flask is cooled and the sticky residue washed in the flask with ether. After pouring off the ether layer, 0.5 g. (1 mole) of thiosemicarbazide, 0.6 g. (1 mole+10% excess) of triethylamine and 25 ml. of ethanol is added to the flask and the whole heated under reflux for 15 minutes. The reaction mixture is chilled and the solid collected on a filter and washed with methanol. The crude dye is dissolved in hot pyridine, the pyridine solution is filtered, methanol is added to the filtrate, and after chilling, the solid is collected on a filter. After another such treatment, the yield of shiny tan crystals is 25% and the melting point is 254° to 255° C. with decomposition.

EXAMPLE II

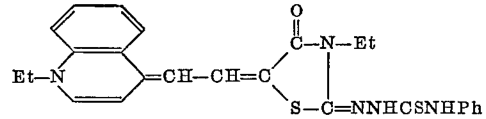

3-ethyl-5-[(1-ethyl-4-(1H)-quinolylidene)ethylidene)-2-[(3-phenylthiouredio)imino]-4-thiazolidinone A mixture of 3-ethyl-5-[(1-ethyl-4-(1H)-quinolylidene)ethylidene]rhodanine (3.4 g., 1 mole) and methyl-p-toluenesulfonate (5.7 g., 1 mole+200%) is fused over an open flame. The resultant melt is heated on a steam bath for three hours, cooled, stirred with ethyl ether (100 ml.) for one hour and the supernatant liquor separated by decantation and filtration. To the semi-solid residue is added 4-phenyl-3-thiosemicarbazide (1.7 g., 1 mole), triethylamine (3.0 ml., 1 mole+110%) and ethanol (25 ml.). The reaction mixture is heated under reflux for ten minutes, cooled, then chilled overnight. The crude dye is filtered off, washed with ethanol and dried. After two recrystallizations from pyridine and methanol, the yield of dark-green crystals is 40% and the melting point is 184° to 186° C. with decomposition.

EXAMPLE III

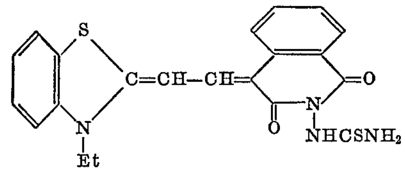

4-[3-ethyl-2-benzothiazolinylidene)ethylidene]-2-thioureido-1,3-(2H, 4H)-isoquinolinedione A mixture of 1.17 g. (1 mole) of 2-thioureido-1,3(2H, 4H)-isoquinolinedione, 2.25 g. (1 mole) of 2-(2-acetanilidovinyl)-3-ethylbenzothiazolium iodide, 0.5 g. (1 mole) of acetic anhydride, 0.5 g. (1 mole) of triethylamine and 25 ml. of pyridine is heated at the refluxing temperature for 10 minutes. The reaction mixture is poured into water and, after stirring, the solid is collected on a filter. The solid is extracted with hot methanol. The remaining residue is dissolved in hot cresol, the cresol solution is filtered, methanol is added to the filtrate, the whole is chilled and the dye is collected on a filter and washed with methanol. After another similar treatment, the yield of brownish-red crystals is 5% and the melting point is 238° to 240° C. with decomposition.

EXAMPLE IV

The dyes are tested in a gelatin-silver chlorobromide emulsion containing 40 mole percent bromide of the type described by Trivelli and Smith, Phot. Journal, 79, 330 (1939). The dyes, dissolved in suitable solvents, are added to separate portions of the emulsion at the concentration indicated. The emulsions are coated at a coverage of 432 mg. of Ag/ft.$^2$ on a cellulose acetate film support. A sample of each coating is exposed on an Eastman IB Sensitometer and to a wedge spectrograph, processed for 3 minutes in Kodak developer D–19, fixed, washed and dried. The results are as follows:

| | Gram dye/mole Ag | Spectral sens. peak (nm.) | Nm. range |
|---|---|---|---|
| Dye of Example: | | | |
| I | 0.10 | 480 | To 540. |
| II | 0.13 | 630 | 520 to 675. |
| III | 0.06 | 550 | To 620. |

EXAMPLE V.—DIRECT PRINT

A coarse grain gelatino silver chlorobromide emulsion consisting of 5 mole percent chloride is coated with and without a dye of Example I above on a paper support, exposed for $10^{-5}$ seconds on an EGG Mark VII Sensitometer and photodeveloped for 10 seconds at 1500 footcandles. The improved sensitivity and density difference between the background and image area is shown below:

| Feature | 0.15 Log E steps | | | | |
|---|---|---|---|---|---|
| | Visible—clear | Visible—Kodak Wratten No. 15 exp. | $D_{min.}$ | $D_{max.}$ | D |
| Control | 10 | 0 | 0.17 | 0.45 | 0.28 |
| 0.5 g./Ag mole dye of Ex. I | 13 | 3 | 0.19 | 0.55 | 0.36 |

The increase in Dmax. over the control is believed to be due to the halogen-acceptance property of the dye.

EXAMPLE VI.—ZINC OXIDE

The two dyes listed in the following table are incorporated into a coating of zinc oxide dispersed in a butadiene-styrene binder by bathing the paper coating in methanol solutions of the dyes (0.1 mg./cc.) for fifteen seconds. The dried samples are charged by a corona discharge, exposed on a sensitometer and on a spectrograph, and developed by a toner using a magnetic brush. The results are as follows:

| Dye | Relative white light speed | Spectral sens. peak. (nm.) | Nm. range |
|---|---|---|---|
| None | 100 | | To 390. |
| Dye of Example: | | | |
| I | 400 | 450 | 400 to 520. |
| II | 500 | 570 | 480 to 680. |

As indicated by Example V the dye compounds of the invention are believed to be halogen acceptors.

It is claimed:

1. A merocyanine dye having the structure:

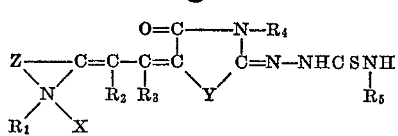

wherein Z represents the atoms required to form a basic heterocyclic nucleus selected from the group consisting of a benzoxazole nucleus, a quinoline nucleus, a benzothiazole nucleus, a naphthothiazole nucleus, a, naphthoxazole nucleus, a benzimidazole nucleus, a benzoselenazole nucleus, a naphthoselenazole nucleus, an oxazole nucleus, a thiazole nucleus, a thiazoline nucleus, or a pseudoindole nucleus; $R_1$ is an alkyl of 1 to 4 carbon atoms or phenyl; $R_2$ and $R_3$ are selected from the group consisting of hydrogen atom, lower alkyl radical of 1 to 4 carbon atoms or phenyl; $R_4$ is selected from the group consisting of a hydrogen atom, an alkyl radical of 1 to 4 carbon atoms or phenyl; $R_5$ is selected from the group consisting of a hydrogen atom, an alkyl of 1 to 4 carbon atoms, or phenyl; and Y is selected from the group consisting of an oxygen atom, a sulfur atom, or a selenium atom.

2. The merocyanine dye of claim 1 wherein Z represents the necessary atoms to form a benzoxazole nucleus.

3. The merocyanine dye of claim 1 wherein Z represents the necessary atoms to form a quinoline nucleus.

4. 3-ethyl-5-[(3-ethyl - 2 - benzoxazolinylidene)ethylideen]-2-thioureidoimino-4-thiazolidinone.

5. 3-ethyl-5-[(1-ethyl - 4(1H) - quinolylidene)ethylidene]-2-[(3-phenylthiouredio)imino]-4-thiazolidinone.

References Cited

UNITED STATES PATENTS 3,326,689 6/1967 Fix ........ 96—139
3,630,749 12/1971 Webster et al. .... 260—240.4 X

OTHER REFERENCES

Chemical Abstracts, vol. 61, cols. 12007 to 12008 (1964).

JOHN D. RANDOLPH, Primary Examiner

U.S. Cl. X.R.

96—1.7, 140; 260—240.1, 240.8, 288 R, 289 R, 298, 304, 306.7